US011574521B2

(12) United States Patent
Aurich et al.

(10) Patent No.: US 11,574,521 B2
(45) Date of Patent: Feb. 7, 2023

(54) PLAYER DISTRACTION DETECTION FOR GAMING ENVIRONMENTS

(71) Applicant: IGT, Las Vegas, NV (US)

(72) Inventors: Sven Aurich, Schwanberg (AT); Michael Russ, Graz (AT); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/225,694

(22) Filed: Apr. 8, 2021

(65) Prior Publication Data

US 2021/0327214 A1 Oct. 21, 2021

Related U.S. Application Data

(60) Provisional application No. 63/013,253, filed on Apr. 21, 2020.

(51) Int. Cl.
*A63F 9/24* (2006.01)
*A63F 11/00* (2006.01)
*G06F 13/00* (2006.01)
*G06F 17/00* (2019.01)
*G07F 17/32* (2006.01)
*G06V 40/20* (2022.01)

(52) U.S. Cl.
CPC .......... *G07F 17/3239* (2013.01); *G06V 40/20* (2022.01); *G07F 17/323* (2013.01); *G07F 17/3211* (2013.01); *G07F 17/3269* (2013.01)

(58) Field of Classification Search
CPC ... G07F 17/32; G07F 17/3211; G07F 17/3213

USPC .................................. 463/1, 20, 22, 25, 39
See application file for complete search history.

(56) References Cited

U.S. PATENT DOCUMENTS

| | | | |
|---|---|---|---|
| 6,729,956 B2 | 5/2004 | Wolf et al. |
| 7,311,605 B2 | 12/2007 | Moser |
| 7,780,529 B2 | 8/2010 | Rowe et al. |
| 8,235,804 B2 | 8/2012 | Gagner et al. |
| 8,545,309 B2 | 10/2013 | Walker et al. |
| 8,758,126 B2 | 6/2014 | Bavitz et al. |
| 8,911,287 B2 | 12/2014 | Gilliand |
| 8,955,002 B2 | 2/2015 | Seiden et al. |
| 9,106,239 B1 | 8/2015 | Li |
| 9,947,171 B2 | 4/2018 | Beaulieu et al. |
| 10,504,323 B2 | 12/2019 | Pinder et al. |
| 10,561,928 B2 | 2/2020 | Nelson |
| 10,706,674 B2 | 7/2020 | Sorey et al. |
| 10,872,499 B1 | 12/2020 | Russ et al. |
| 2002/0039921 A1 | 4/2002 | Rowe et al. |
| 2010/0121808 A1 | 5/2010 | Kuhn |
| 2010/0210350 A9 | 8/2010 | Walker et al. |
| 2010/0240458 A1 | 9/2010 | Gaiba et al. |
| 2013/0267324 A1 | 10/2013 | Froy et al. |

(Continued)

OTHER PUBLICATIONS

CoDriver for Driver Monitoring, located at: https://www.jungo.com/st/codriver-segments/codriver-driver-monitoring, available prior to Apr. 8, 2021.

*Primary Examiner* — Adetokunbo O Torimiro
(74) *Attorney, Agent, or Firm* — Neal, Gerber & Eisenberg LLP

(57) ABSTRACT

A player distraction detector for gaming environments configured to determine player distraction level data usable to cause a change an output by a gaming system based on the player distraction level data.

19 Claims, 7 Drawing Sheets

(56) References Cited

U.S. PATENT DOCUMENTS

| | | |
|---|---|---|
| 2016/0027249 A1 | 1/2016 | Nelson et al. |
| 2016/0267335 A1* | 9/2016 | Hampiholi ........... B60K 28/066 |
| 2017/0169659 A1 | 6/2017 | Froy |
| 2017/0169662 A1* | 6/2017 | Froy .................. G06Q 30/0261 |
| 2017/0267169 A1* | 9/2017 | Fleurence ................ B60Q 3/85 |
| 2018/0053194 A1 | 2/2018 | Bond et al. |
| 2018/0092557 A1 | 4/2018 | Bickford et al. |
| 2019/0355209 A1 | 11/2019 | Sorey et al. |
| 2020/0043282 A1 | 2/2020 | Keilwert et al. |
| 2020/0066093 A1* | 2/2020 | Schwartz ............ G07F 17/3239 |
| 2020/0151993 A1 | 5/2020 | Russ et al. |
| 2020/0151994 A1 | 5/2020 | Froy et al. |
| 2021/0158649 A1* | 5/2021 | Russ ....................... G06F 21/51 |

* cited by examiner

PLAYER DISTRACTION DETECTION FOR GAMING ENVIRONMENTS

PRIORITY

This application claims priority to and the benefit of U.S. Provisional Patent Application No. 63/013,253, filed Apr. 21, 2020, the entire contents of which is incorporated herein by reference.

BACKGROUND

The present disclosure relates to player distraction detection for gaming environments.

Electronic gaming machines enable players to play primary wagering games that include the display of a plurality of primary game wagering components. Electronic gaming machines may also include one or more secondary games that include the display of a plurality of secondary game components.

BRIEF SUMMARY

Various embodiments of the present disclosure provide an electronic gaming machine including a player distraction detector, a display device, an audio output device, a processor, and a memory device storing a plurality of instructions that, when executed by the processor, cause the processor to cause a display, by the display device, of a plurality of plays of a game, during the plurality of plays of the game, operate with the player distraction detector to determine player distraction level data for a player of the electronic gaming machine, and responsive to the player distraction level data indicating that the player is distracted from one of the plurality of plays of the game, change an output of one of the display device and the audio device in association with one of the plurality of plays of the game.

Various embodiments of the present disclosure provide an electronic gaming machine including a display device, an audio output device, a processor, and a memory device storing a plurality of instructions that, when executed by the processor, cause the processor to cause a display, by the display device, of a plurality of plays of a game, during the plurality of plays of the game, receive, from a player distractor detector, player distraction level data fora player of the electronic gaming machine, and responsive to the player distraction level data indicating that the player is distracted from one of the plurality of plays of the game, change an output of one of the display device and the audio device in association with one of the plurality of plays of the game.

Various embodiments of the present disclosure provide a method of operating an electronic gaming machine, wherein the method includes determining, by a processor, player distraction level data relating to game play by a player of the electronic gaming machine, and responsive to the player distraction level data indicating that the player is distracted from the game play, causing an output of one of a display device of the electronic gaming machine and an audio device of the electronic gaming machine in association with the game play to account for the player being distracted from the game play.

Additional features are described in, and will be apparent from, the following Detailed Description and the Figures.

DETAILED DESCRIPTION

Figure 1:
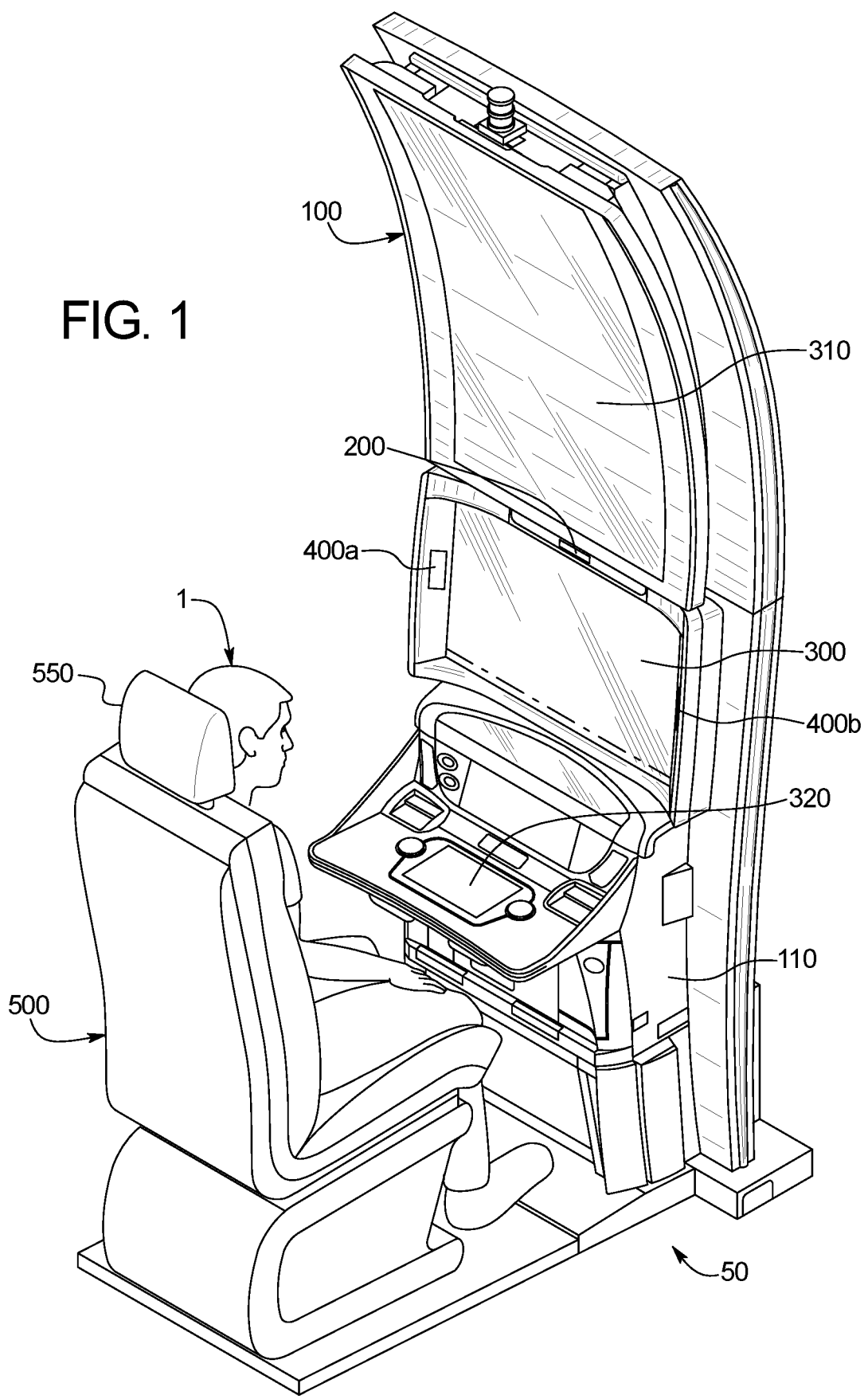
FIG. 1 is a front perspective view of one example embodiment of an electronic gaming machine of the gaming system of the present disclosure, and a player sitting on a player chair in front of the electronic gaming machine, wherein the electronic gaming machine includes a player distraction detector configured to detect when the player is distracted such that the electronic gaming machine can cause an action in response to detecting that the player is distracted.

The present disclosure provides player distraction detection for gaming environments and particularly for gaming systems. In various example embodiments, the gaming system and method of the present disclosure provide an electronic gaming machine ("EGM") including a player distraction detector. In certain such embodiments, the player distraction detector is positioned in or otherwise coupled to the EGM of the gaming system. In various other example embodiments, the gaming system and method of the present disclosure provide an EGM configured to operate with a player distraction detector that is separate from and not part of the EGM. In certain such embodiments, the player distraction detector is configured to communicate with the EGM. For brevity and clarity, and unless specifically stated otherwise, the term "EGM" is used herein to refer to an electronic gaming machine (such as but not limited to a slot machine, a video poker machine, a video card machine, a video lottery terminal (VLT), a video keno machine, a video bingo machine, or a betting terminal).

Certain of the components of the example EGMs and example player distraction detectors are first discussed below under the EGMS WITH PLAYER DISTRACTION DETECTOR section heading. Various other components that can be provided with an EGM of the present disclosure are then subsequently discussed below under the EGM—GENERAL COMPONENTS AND OPERATION section heading. These headings are not meant to limit the scope of the present disclosure in any manner. It should also be appreciated that the present disclosure can be used in other suitable machines.

EGM Associated with Player Distraction Detector

Referring now to FIGS. 1, 2, 3, and 4, one example gaming system of the present disclosure is generally illustrated and indicated by numeral 50. This example gaming system generally includes an EGM 100. A player chair 500 is positioned in front of the EGM 100. The EGM 100 includes player distraction detector 200, and a plurality of other components as further described herein. In this illustrated example embodiment, the player distraction detector 200 is attached to and supported by the housing 110 of the EGM 100.

In this illustrated example embodiment, the EGM 100 includes the housing 110 and a plurality of output devices and a plurality of input devices among other components of the EGM 100. This illustrated example embodiment of the EGM 100 includes: (a) a first (intermediate) display device 300; (b) a second (upper) display device 310 positioned above the first display device 300; and (c) a third (lower) display device 320 positioned below the first display device 300. These output devices are configured to display the games, game components, game instructions, game inputs, game outputs, game outcomes, game awards (such as the primary and/or secondary games awards), and various other functionality and information to players. This illustrated example embodiment of the EGM 100 includes a plurality of player input devices (not labeled) that enable players to play one or more wagering games provided by the EGM 100 and otherwise interact with the EGM 100. These player input devices are physically touchable and thus activatable by the players to enable the player to make inputs into the EGM 100. These output devices and input devices are configured such that a player may operate the EGM while sitting in front of the EGM 100 such as when sitting on a player chair 500 such that the player's head is approximately at the same height as the first display device 300 and is approximately at the same height as the headrest 550 of the player chair 500 as generally shown in FIGS. 1, 2, 3, and 4. Such output devices and such player input devices can also include one or more of the devices described below in the second section of this detailed description.

This example EGM 100 illustrated in FIGS. 1, 2, 3, and 4 includes one or more processors (not shown or labeled and further described below), and one or more memory devices (not shown or labeled and further described below), among other components. In various embodiments, the player distraction detector 200 is configured to operate with the one or more processors of the EGM 100 and the one or more memory devices of the EGM 100 to determine and use player distraction levels as further discussed herein. In various other embodiments, the player distraction detector 200 includes one or more processors (not shown or labeled) and one or more memory devices (not shown or labeled), and is configured to operate with these one or more processors and one or more memory devices to determine player distraction levels as further discussed herein, and is configured to operate with the one or more processors of the EGM 100 and the one or more memory devices of the EGM 100 to use the player distraction levels as further discussed herein.

In various embodiments, the player distraction detector 200 is configured to make determinations of player distraction levels on a continuous basis. In other embodiments, the player distraction detector 200 is configured to make such determinations of player distraction levels on a regular basis (such as at regular intervals). In other embodiments, the player distraction detector 200 is configured to make such determinations responsive to each occurrence of one or more triggering events (such as but not limited to a designated display of a component of a play of a game by one of the display devices of the EGM 100). In other embodiments, the player distraction detector 200 is configured to make such determinations responsive to an upcoming event in a play of a game (such as but not limited to an occurrence of a triggering event for a secondary game or an award above a certain level about to be provided to the player).

In various embodiments, the EGM 100 and the player distraction detector 200 employ a suitable initiation process to determine one or more player characteristics that are subsequently used by the player distraction detector to determine player distractions levels.

In various embodiments, the processor(s) of the EGM 100 receive and process signals from the player distraction detector 200 to create player distraction level data. In various other embodiments, the player distraction detector 200 itself creates player distraction level data. The player distraction detector 200 and/or the EGM 100 can store this player distraction level data and/or can send this player distraction level data to a remote system such as a player distraction level data storage system. In various embodiments, the EGM 100 can also use this player distraction data on a real or substantially real time basis to enhance player interaction with the EGM 100.

In this illustrated example embodiment, the player distraction detector 200 is configured to work with the EGM 100 to determine increases in player distraction levels (such as, for example, a drop in the player's attention to the EGM 100 or the images displayed by one or more display devices of the EGM 100) and to use this information regarding player distraction levels on a real or substantially real time basis to enhance player interaction with the EGM 100.

In example embodiments such as shown in FIGS. 1, 2, 3, and 4, the player distraction detector 200 includes: (1) one or more cameras configured to obtain digital images of the player 1; (2) a processor (not shown) configured to process the received player images and to create electrical signals based on such received player images; and (3) to transmit such electrical signals to a processor of the EGM to determine the player's distraction level based on such electric signals (such as if the player is distracted or not or if the player's attention to the EGM 100 has dropped). It should be appreciated that the player's distraction level can be used by the EGM in any one or more manners such as the manners described here.

In other example embodiments, the player distraction detector includes: (1) one or more cameras configured to obtain digital images of the player; (2) a processor (not shown) configured to process the received player images and to create player distraction data based on such received player images; and (3) to transmit such player distraction data to a processor of the EGM to enable the EGM to use that player distraction data in any one or more manners such as the example manners described herein.

In various example embodiments, the player distraction detector is configured to sense the position and/or orientation of the head of the player. In various example embodiments, the player distraction detector is configured to sense the position and/or direction of the eyes of the player. In various example embodiments, the player distraction detector is configured to sense the position and/or orientation of the head of the player and is configured to sense the position and/or direction of the eyes of the player. In various example embodiments, the player distraction detector is configured to detect the presence, position, and/or orientation of one or more devices of the player (e.g., the player's mobile phone). In various example embodiments, the player distraction detector is configured to detect the presence, position, and/or orientation of one or more bystanders or spectators. In various embodiments, some or all this information can be used to generate player distraction level data.

In various embodiments, the EGM uses this player distraction level data without indicating or displaying the specific determined player distraction levels to the player.

In various embodiments, the EGM uses and indicates or displays this information to the player based on this player distraction level data. In certain of these example embodiments, for example, the EGM employs a suitable value range (such as from 0 to 100, or from low to high) to display the player distraction levels or indications thereof to the player. In certain such embodiments, the EGM displays the player distraction levels using a display meter that appears on one (or more) of the display devices of the EGM. In one such example embodiment, the EGM displays a player distraction meter.

In various embodiments, the player distraction level data includes but is not limited to: (1) data representing to what extent the player is not focusing on the EGM 100 or images (such as game components) displayed by the EGM; (2) data representing when the player distraction level data was determined; (3) data representing durations of the player distraction levels; and/or (4) data representing other suitable information regarding the player distraction levels. The player distraction level data may further include or otherwise be associated with player distraction level contextual data such as game based display data (such as data representing content displayed in association with a play of and the timing such content was displayed). Such receipt, collection, and processing of the player's distraction level to create such distraction level data, when coupled with the collected player distraction level contextual data, provides data regarding inputs made by the player at the EGM.

In various embodiments, the EGM can send this player distraction data to a remote player distraction data storage device for subsequent use such as for game play analysis and/or new game play design.

In various embodiments, the EGM may be configured to use the player distraction levels in any one or more of a plurality of different ways.

In various embodiments, the EGM is configured to use the player distraction level data to determine how the player is interacting with the EGM.

In various embodiments, the EGM is configured to use this player distraction level data to alter game play and/or game play display to the player in real time (or substantially in real time).

In various embodiments, the EGM is configured to use the player distraction level data to prompt and receive one or more inputs from the player unrelated to game play.

In various embodiments, the EGM is configured to use the player distraction level data to prompt and receive inputs from the player relating to game play. In various such examples, the EGM requires the player to focus on a target for something to happen in a game or an advantage to be provided to the player (or for the player to have a better opportunity in a play of a game).

It should be appreciated that the present disclosure is not limited to the various different example uses of player distraction levels described herein.

It should also be appreciated that the player distraction detector may include or be employed in combination with one or more other player sensors or input devices such as but not limited to: eye tracking or eye gaze sensors, pulse sensors, galvanic skin response sensors, eye pupil dilation sensors, blush response sensors, voice input mechanisms, and hand or foot input devices.

In various embodiments, the EGM includes one or more sound producing devices (such as speakers) that produce one or more sounds that are coordinated with the changes made by the EGM in association with player distraction level data.

In various embodiments, the EGM can employ one or more of the player tactile feedback providers to provide player tactile feedback to the player based on player distraction level data.

Referring now to FIGS. 1, 2, 3, 4, and 5, the illustrated example electronic gaming machine 100 includes: (1) a housing 110, (2) a player distraction detector 200, (3) display devices 300, 310, and 320), (4) audio output devices and specifically speakers 400a and 400b), (5) a processor (not shown), and (6) a memory device (not shown).

In the illustrated example embodiment, the player distraction detector 200 includes a camera (not separately labeled) supported by the housing 110 of the EGM 100. The camera may be positioned in the middle of the EGM above the display 300, oriented such that it captures a field of view including the player 1. As mentioned above, in other example embodiments, the player distraction detector can also include or be communicatively connected to one or more other devices, which can include eye tracking or eye gaze sensors, pulse sensors, galvanic skin response sensors, eye pupil dilation sensors, blush response sensors, voice input mechanisms, and/or hand or foot input devices.

In this illustrated example embodiment, the EGM 100 includes one or more of the first (intermediate) display device 300, second (upper) display device 310 positioned above the first display device 300, and third (lower) display device 320 positioned below the first display device 300. The display device(s) can display the games and associated visuals, as well as one or more alerts, warnings, and questions posed to the player 1. In certain examples, the display device(s) can also be configured to operate with a touch screen to receive inputs from players. Further, as discussed below, the display device(s) may be configured to modify or change what is displayed based at least in part on the distraction level data determined via the player distraction detector 200.

The audio output device and specifically the speakers 400a and 400b. are positioned on the left and right side of the first display device 300 in this example EGM 100. However, it should be understood that the speakers can be positioned in alternate locations, may be integrated with one or more other components of the EGM 100, and/or may be separate from the EGM 100. The content of the audio output by the audio output device can be determined at least in part based on the distraction level data determined via the player distraction detector 200, as discussed in further detail below.

In this illustrated example embodiment, the EGM 100 includes a processor (not shown) and a memory device (not shown) storing a plurality of instructions, which when executed by the processor, cause the processor to carry out various acts and functions described herein. In particular, the instructions cause the processor to, during the plurality of plays of the game, operate with the player distraction detector 200 to determine and/or use player distraction level data for a player of the EGM 100.

In certain various different modes of operation, the EGM 100 can determine the player distraction level data for the player 1 of the electronic gaming machine 100 on one of a continuous basis during the plurality of plays of the game, and at regular intervals during the plurality of plays of the game. For instance, the player distraction level data may be determined every second, multiple times per second, or at longer intervals. In other examples, the player distraction level data may be determined based on specific occurrences, such as after a predetermined period of inactivity, when a input button is pressed, after the play of a game, after a certain action or event has occurred, and more. In other modes of operation, the EGM 100 may determine the player distraction level data based on a determination that the player 1 is using a mobile device 600 separate from the EGM 100.

In various other modes of operation, the EGM 100 may determine the player distraction level data based on: (1) the detection of the player 1 and one or more bystanders or spectators, (2) the position of the player 1, (3) the position of the bystanders or spectators, (4) the age of the player 1, (5) the gender of the player 1, and/or (6) a combination of the factors above or other factors.

In various modes of operation, the EGM 100 and/or the player distraction detector 200 monitors for and determines one or more conditions of the player 1 such as level of drowsiness or indications thereof such as head bobbing, closed eyes, snoring, etc.

In various embodiments, these factors can be analyzed to determine both the level of player focus as well as the direction of that player focus (e.g., whether it is directed at the EGM 100, to the phone 600, or some other direction). For instance, the player 1 may be focused on the EGM 100, and then receive a phone call. The player 1 may answer the phone call, and have his focus switch to the phone 600, rather than the EGM 100. This distraction may be different from a different distraction scenario where the player 1 is watching a video on his phone (such as for an extended period of time). The EGM 100 may take different actions based on these different types of player distractions indicated by the distraction level data, such as where that data is different based on whether the player 1 is distracted or focused, and if he is focused, where that focus is placed (e.g., toward the EGM 100, the phone 600, or somewhere else).

In response to the player distraction level data indicating that the player is distracted from one of the plurality of plays of the game, the EGM 100 may make one or more changes to an output of one or more of the display devices 300, 310, and/or 320 and/or one or more the audio device 400*a* and 400*b* such as in association with one of the plurality of plays of the game.

In various example embodiments, based on the player distraction level data, the EGM 100 may reduce the required attention of the player 1. This can include lowering the volume, pausing a game, pausing certain features or actions of a game, or other actions. For instance, if the player 1 is detected to be on a phone call, the EGM 100 may pause or delay one or more game components until the call is finished, so that the player 1 does not miss any important part of the game play. In addition, the EGM 100 may reduce the required attention of the user based on a detection of the player 1 speaking to a bystander, spectator, waiter or waitress, etc. This may correspond with a focused player, albeit with the player's focus being directed away from the EGM 100.

In various example embodiments, based on the player distraction level data, the EGM 100 may increase the required attention of the player 1. This can include increasing the volume, triggering a particular game play event or action, requiring player input, and or other actions. For instance, if the player distraction level data indicates that the player 1 is bored, playing with the player's phone, or otherwise distracted to a certain degree, the EGM 100 may increase the volume and display a prompt asking "are you still playing?" This may cause the player 1 to refocus on the EGM 100.

In various example embodiments, based on the player distraction level data, the EGM 100 may change the output of one or more of the display devices 300, 310, and/or 320. This can include reducing a screen brightness, to increase privacy while player 1 is distracted. Various other example changes are further described below.

Figure 2:
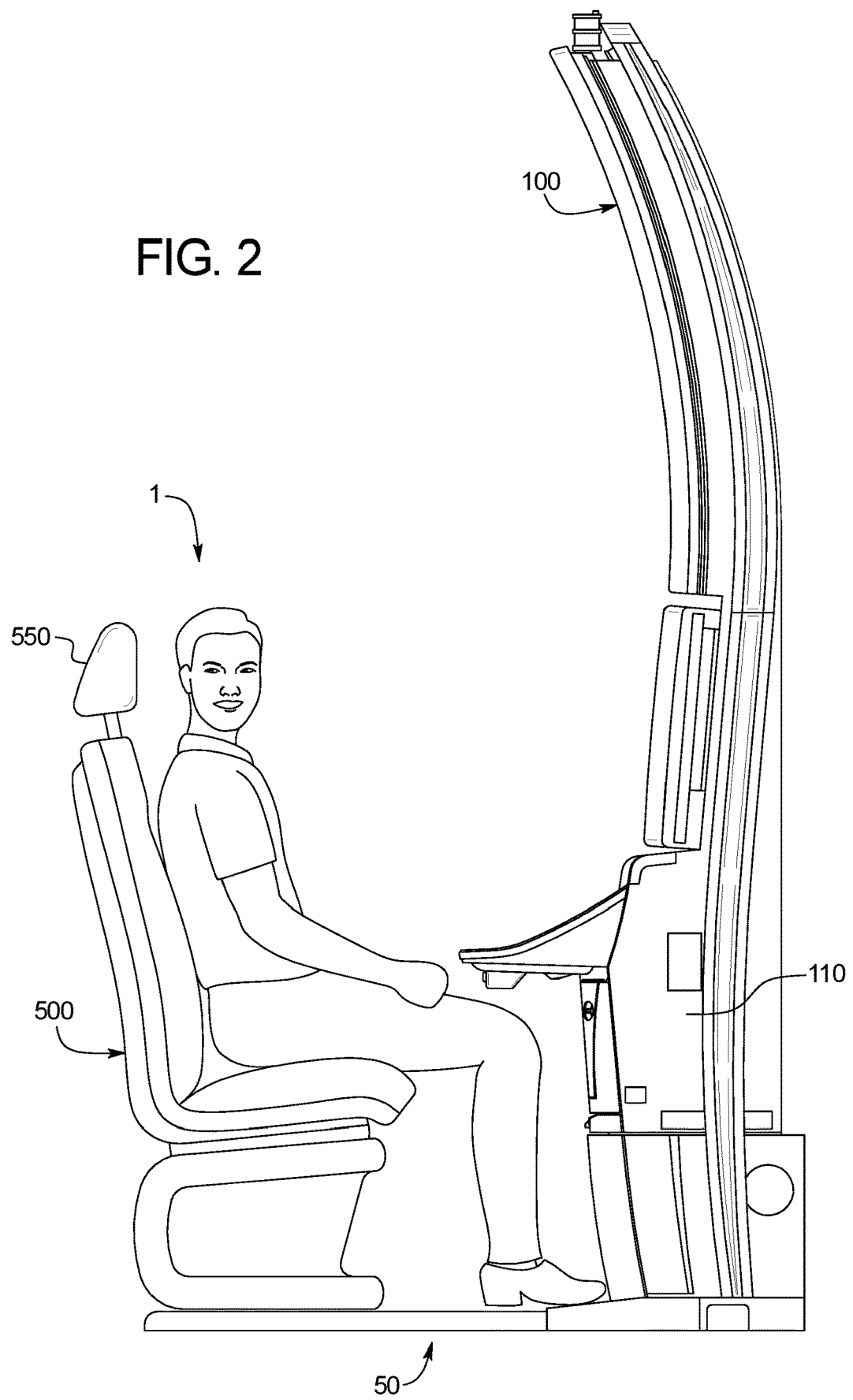
FIG. 2 is a side view of the electronic gaming machine and player sitting in the player chair of FIG. 1, wherein the player is distracted and is looking away from the electronic gaming machine.
Figure 3:
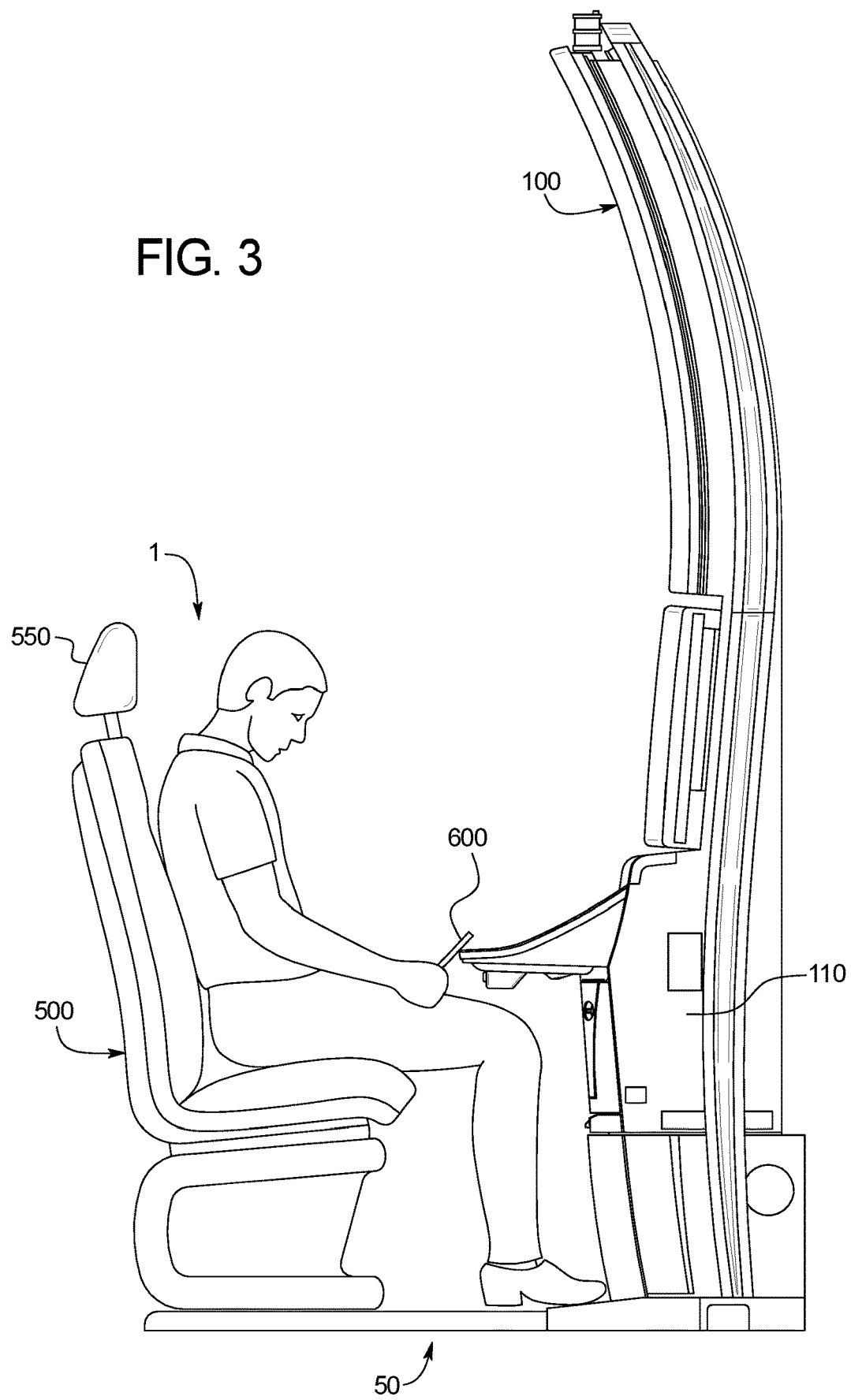
FIG. 3 is a side view of the electronic gaming machine and player sitting in the player chair of FIG. 1, wherein the player is distracted and is looking at his phone.
Figure 4:
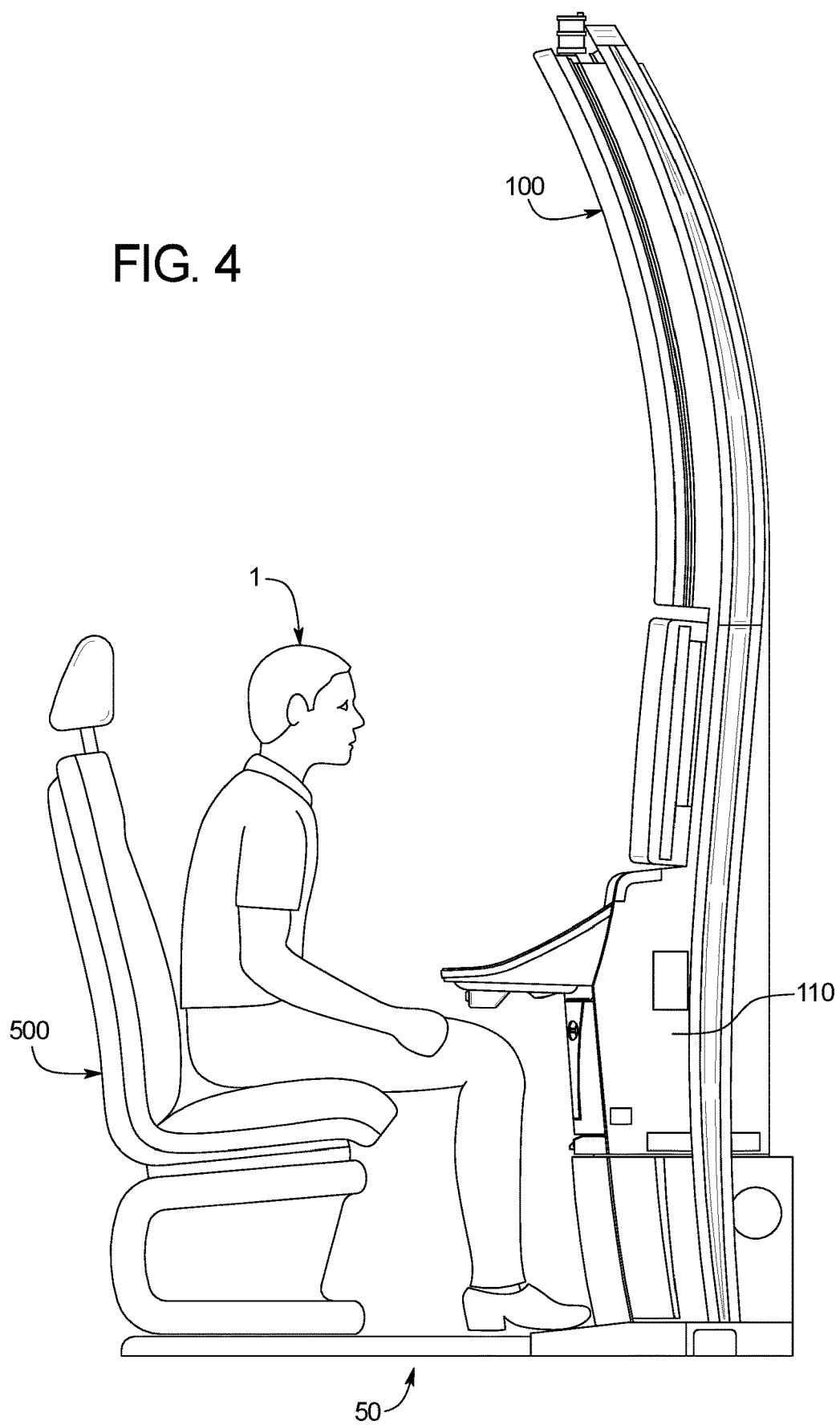
FIG. 4 is a side view of the electronic gaming machine and player sitting in the player chair of FIG. 1, wherein the player is leaning forward in the player chair.
Figure 5:
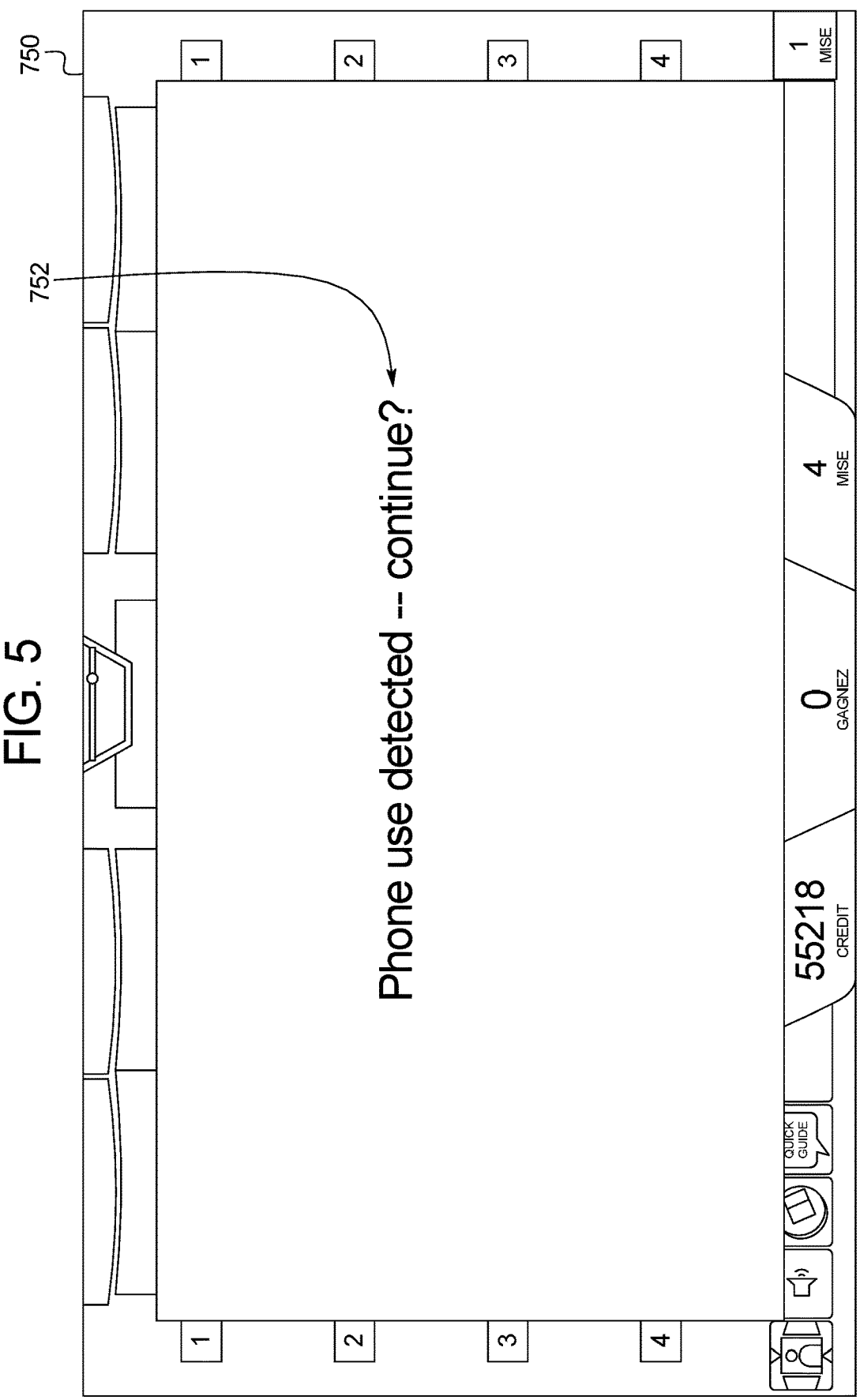
FIG. 5 is an example electronic gaming machine display of one embodiment of the present disclosure.

In various example embodiments, based on the player distraction level data, the change of the output of the display device includes a change in the display, by a display device, of an action in one of the plurality of plays of the game configured to increase attention by the player to one of the plurality of plays of the game. For instance, if the player is detected as looking away from the display device 300 (such as shown in FIG. 2) or phone use by the player is detected (such as shown in FIG. 3), the display may output idle animations and/or the audio output device may increase the output volume to try to get the player back to the game.

In various example embodiments, when the player 1 is distracted, the game presentation by the display device may focus only on very interesting events, and may skip presentation of minor events. Certain events such as winning plays may always be displayed, but other events may be prevented from being displayed. This enables the player to more easily recognize when an important event (or event requiring his or her attention) has occurred.

In various example embodiments, based on the player distraction level data, the change of the output of the display device includes a pause of a display, by the display device, of one of the plurality of plays of the game. For instance, if the player is detected as being on a phone call, the processor may pause the entire game until the call is over. The EGM 100 may also cause the display by one of the display devices of an alert, wherein the alert may indicate that the game has been paused due to the phone call. The EGM 100 can also provide additional information to incentivize the player to return to the game, such as by causing one of the display devices to indicated that "there will be a big win within the next 10 games—finish your call quickly to return to the game and to not lose this guaranteed win!"

In various example embodiments, EGM 100 may enables the distracted player to continue to play the game(s). In certain such instances, the EGM 100 may lock or halt the game after a certain event to prevent the player from continuing to play without noticing the event. Then, when it is clear that the player has returned his attention to the game, the EGM 100 may continue the game play.

In various example embodiments, based on the player distraction level data, the change of the output of the display device includes a delay of a display, by the display device, of an action in one of the plurality of game plays. For instance, the EGM 100 may cause certain events to be delayed, such as a winning presentation, incrementing of a counter, a free game, a pick feature, and more. For instance, in a game with rising bubbles that are part of a pick feature, the game may pause the position of the bubbles until the player has finished his or her call, and/or returned his or her attention to the game play.

In various example embodiments, based on the player distraction level data, the change of the output of the display device includes a display, by the display device, of a notice to the player. For instance, upon detecting that the player 1 is on a phone call, the EGM 100 may prompt a message such as "phone use detected—Continue?" This is illustrated by message 752 displayed on display 750 of FIG. 5. If the player 1 inputs a yes response, the EGM 100 may cause the game or game event to continue. Otherwise, if no response is detected, the game or game event may be paused until the call is finished and/or the player's attention is returned to the EGM 100.

In various example embodiments, based on the player distraction level data, the EGM may detect the use of a phone (e.g., phone 600). The phone may be detected by the EGM 100 itself, and/or via one or more sensors or devices connected to the EGM 100. In response, the EGM 100 may prompt the player 1 to connect the phone to the EGM 100. This can include displaying a notice or request to connect, display a code for the player 1 to input via the phone, or displaying some other notice. This can enable the player 1 to use the phone 600 as a mobile remote, voice input, voice output, and more. The phone 600 may be connected to the EGM 100 via any suitable wired or wireless technology.

In various of the example embodiments noted above, the EGM 100 may detect the presence of a phone (such as phone 600), which may be connected to the EGM 100. Where the phone is connected, the EGM 100 may authenticate the phone via one or more user authentication concepts (e.g., 2-factor authentication, QR code, etc.). This information may be stored on the mobile device, the EGM 100, by a backend server, or in some other location to speed up the connection process the next time the same player wants to connect his device. Additionally, in various examples the connection of the phone 600 to the EGM 100 can provide an ability to alert the player 1 if he or she leaves the EGM without the phone 600. The EGM 100 can detect that the phone 600 has been left behind when the player 1 gets up to leave, and can provide an alert or prompt to the player 1 to not forget the device.

In various example embodiments, based on the player distraction level data, the EGM 100 may cause the display device to display one or more limited offerings (that are different than one or more wagering games provided by the EGM) for a certain period of time based on the player distraction level data. The display may include a countdown timer, which can be used to cause the player to return his attention to the EGM 100 more quickly.

In various example embodiments, the EGM 100 may pose a question to the player 1 based on the player level distraction data. For instance, if a phone call is detected, the display may include a question asking the player 1 if he wants to play in autoplay, or some other mode requiring less player input. The player 1 may elect to do so, and thus be able to both take the phone call and play the game, without the need to concentrate on pressing the play button repeatedly during the call. In this case, the EGM 100 may pause or stop the game at certain specific game events (e.g., winning plays, events requiring player input, etc.).

In various example embodiments, based on the player distraction level data, the EGM 100 may detect the absence of the player 1, or distraction of the player 1. The absence or distraction of the player 1 may be detected directly by the EGM 100, or via one or more other connected sensors or devices. In response, the EGM 100 may ask the user if he or she wants to replay the latest game(s). This can create a better level of immersion back into the game, particularly where the player 1 reenter's the game after a long period of distraction.

In various example embodiments, based on the player distraction level data, the EGM 100 may change the output of the audio output device. The change in output can include a change in volume, outputted by the audio device, associated with one of the plurality of plays of the game. For instance, if a phone call is detected, the EGM 100 may automatically reduce the game volume output by the audio output device until the call is finished. This enables the player 1 to both talk on the phone, and play the game, without the audio from the game affecting the phone call. In another example, if phone use is detected (e.g., texting messages or watching a video), the EGM 100 may cause the audio output device to output game sounds louder to get the player's attention back to the game.

In various example embodiments, the EGM 100 may determine baseline player data comprising data related to an image of the player when the player is not distracted from one of the plurality of plays of the game. This baseline player data may then be compared to images or data captured at a later time, to determine a level of distraction of the player 1. The baseline player data may be determined directly by the EGM 100, by the player distraction detector 200, and/or by one or more other sensors or devices connected to the EGM 100.

In various example embodiments, the EGM 100 may determine a plurality of different degrees of changes to the baseline player data. The EGM 100 may monitor player distraction over time, and may classify the degree of player distraction (e.g., light, medium, high). In some examples, the EGM 100 may determine a simple yes/no answer to the question of whether the player 1 is distracted, while in other examples there may be a range of answers (light, medium, high), while in still other examples the distraction level may be determined as a numerical value (e.g., 1-10). Then, based on the determined level of distraction, the EGM 100 may dynamically change game content (e.g., graphics, animations, sound output, haptics, timing of certain events, game options, etc.). In one example, during higher levels of detected distraction, the game may include more methods of interaction between the player 1 and the EGM 100 (e.g., more frequent interaction, bonus objects appear on the display, bringing some bonus credits when touched, and more). These additional methods of interaction may incentivize the player 1 to bring his or her attention back to the game.

In various example embodiments, the EGM 100 may detect the position of the player's distraction, and modify content dynamically to regain the attention of the player. For instance, if the player 1 keeps looking to his or her right (as shown in FIG. 2), the EGM 100 may cause important content to be displayed on the right side of the display, so that player 1 can more easily see the content out of the corner of his or her eye. In another example, if the player 1 keeps looking down (onto phone 600, as in FIG. 3), the EGM 100 may cause the lower display 320 to display messages, game content, or other images to increase the likelihood of the player 1 seeing them.

In various example embodiments, during a game session, the EGM 100 may be configured to remember the player triggering certain game actions at specific events, and learn to trigger those game actions automatically over time. For instance, if it is observed that whenever the player 1 receives a call he or she mutes the output audio, the EGM 100 may automatically mute the output audio in response to a future call being detected. In another example, the EGM 100 may monitor the player's response to the presence of a spectator or bystander. For instance, if the player mutes the audio output, or pauses the game whenever a waiter or waitress is present, the EGM 100 may automatically trigger a mute when a waiter or waitress is detected in the future.

In various example embodiments, the EGM 100 (via the player distraction detector 200) may be configured to detect the presence of other personal items of the player (e.g., a purse). The EGM 100 can then also prompt the player 1 to remember these items when he or she leaves. In the event that the player 1 forgets a personal item, the EGM 100 can alert a staff member about the item left behind so that the staff member can take an appropriate action.

Figure 6:
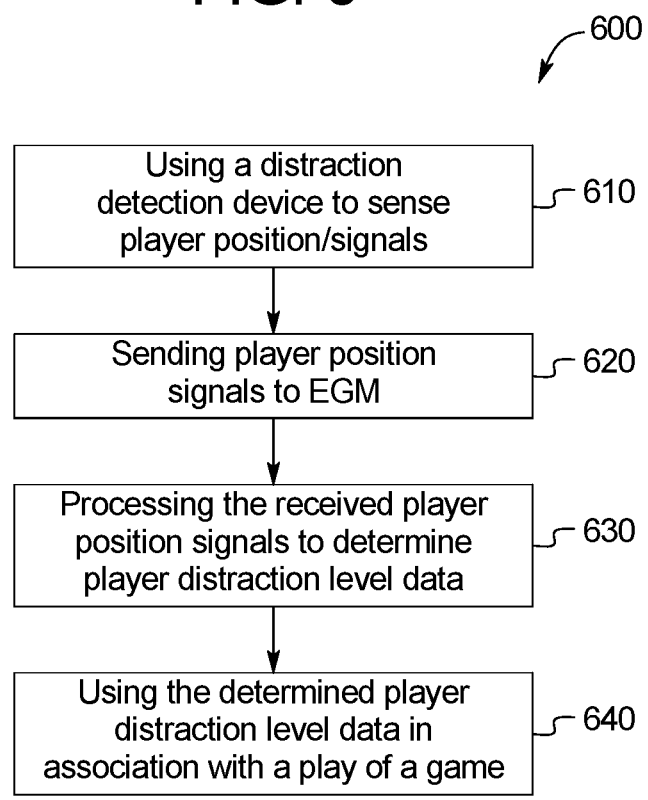
FIG. 6 is a flowchart of one example embodiment of a method of operating the gaming system of the present disclosure.

Referring now to FIG. 6, FIG. 6 is a flowchart of one example method of operating the gaming system including an EGM and a player distraction detector of the present disclosure. The method 600 is represented by a set of instructions stored in one or more memories and executed by one or more processors. Although the method 600 is described with reference to the flowchart shown in FIG. 6, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

This example method 600 generally includes: (1) using a player distraction detector to sense player position signals, as indicated in block 610; (2) sending player positions signals to the EGM, as indicated in block 620; (3) processing the received player positions signals to determine player distraction level data as indicated in block 630; and (4) using the determined player distraction level data in association with a play of a game, as indicated in block 640.

It should be appreciated that the present disclosure provides an improvement in gaming technology, in part, by facilitating enhanced physical interactions between players and gaming systems such as EGMs.

It should be appreciated that the present disclosure provides an improvement in gaming technology, in part, by reducing the important game events missed by a player during game play.

EGM—General Components and Operation

The EGM of the present disclosure can be controlled locally by one or more processors, and/or remotely or partially remotely by one or more remote processors, central servers, central controllers, or remote host. In various embodiments, the EGM of the present disclosure can be part of a gaming system (which is also part of the present disclosure) that includes one or more EGMs in combination with one or more remote processors, central servers, central controllers, or remote hosts. In such embodiments, the EGM is configured to communicate with the remote processors, central servers, central controllers, or remote hosts through a data network or remote communication link. In certain such embodiments, the EGM is configured to communicate with one or more other EGMs through the same data network or remote communication link or through a different data network or remote communication link.

In certain embodiments in which the gaming system includes an EGM in combination with a remote processor, central server, central controller, or remote host, the remote processor, central server, central controller, or remote host is any suitable computing device that includes at least one processor and at least one memory device or data storage device. As further described herein, the EGM includes at least one EGM processor configured to transmit and receive data or signals representing events, messages, commands, or any other suitable information between the EGM and the remote processor, central server, central controller, or remote host. The at least one processor of that EGM is configured to execute the events, messages, or commands represented by such data or signals in conjunction with the operation of the EGM. Moreover, the at least one processor of the remote processor, central server, central controller, or remote host is configured to transmit and receive data or signals representing events, messages, commands, or any other suitable information between the remote processor, central server, central controller, or remote host and the EGM. One, more than one, or each of the functions of the at least one processor of the EGM may be performed by the remote processor, the central server, the central controller, or the remote host.

In certain such embodiments, computerized instructions for controlling any games (such as any primary or base games and/or any secondary or bonus games) displayed by the EGM are executed by the remote processor, central server, central controller, or remote host. In such "thin client" embodiments, the remote processor, central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the remote processor, central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a remote processor, central server, central controller, or remote host, computerized instructions for controlling any primary or base games displayed by the EGM are communicated from the remote processor, central server, central controller, or remote host to the EGM in a thick client configuration, and computerized instructions for controlling any secondary or bonus games or other functions displayed by the EGM are executed by the remote processor, central server, central controller, or remote host in a thin client configuration.

In certain embodiments in which the gaming system includes: (a) an EGM configured to communicate with a remote processor, central server, central controller, or remote host through a data network; and/or (b) a plurality of EGMs configured to communicate with one another through a data network, the data network is a local area network (LAN) in which the EGMs are located substantially proximate to one another and/or the remote processor, central server, central controller, or remote host. In one example, the EGMs and the remote processor, central server, central controller, or remote host are located in a gaming establishment or a portion of a gaming establishment.

In other embodiments in which the gaming system includes: (a) an EGM configured to communicate with a remote processor, central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the remote processor, central server, central controller, or remote host. For example, one or more of the EGMs are located: (a) in an area of a gaming establishment different from an area of the gaming establishment in which the remote processor, central server, central controller, or remote host is located; or (b) in a gaming establishment different from the gaming establishment in which the remote processor, central server, central controller, or remote host is located. In another example, the remote processor, central server, central controller, or remote host is not located within a gaming establishment in which the EGMs are located. In certain embodiments in which the data network is a WAN, the gaming system includes a remote processor, central server, central controller, or remote host and an EGM each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a remote processor, central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the remote processor, central server, central controller, or remote host identifies a player prior to enabling that player to place any wagers on any plays of any wagering games. In one example, the remote processor, central server, central controller, or remote host identifies the player by requiring a player account of the player to be logged into via an input of a unique username and password combination assigned to the player. The remote processor, central server, central controller, or remote host may, however, identify the player in any other suitable manner, such as: by validating a player tracking identification number associated with the player; by reading a player tracking card or other smart card inserted into a card reader (as described below); by validating a unique player identification number associated with the player by the remote processor, central server, central controller, or remote host; or by identifying the EGM, such as by identifying the MAC address or the IP address of the Internet facilitator. In various embodiments, once the remote processor, central server, central controller, or remote host identifies the player, the remote processor, central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server".

The remote processor, central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 7:
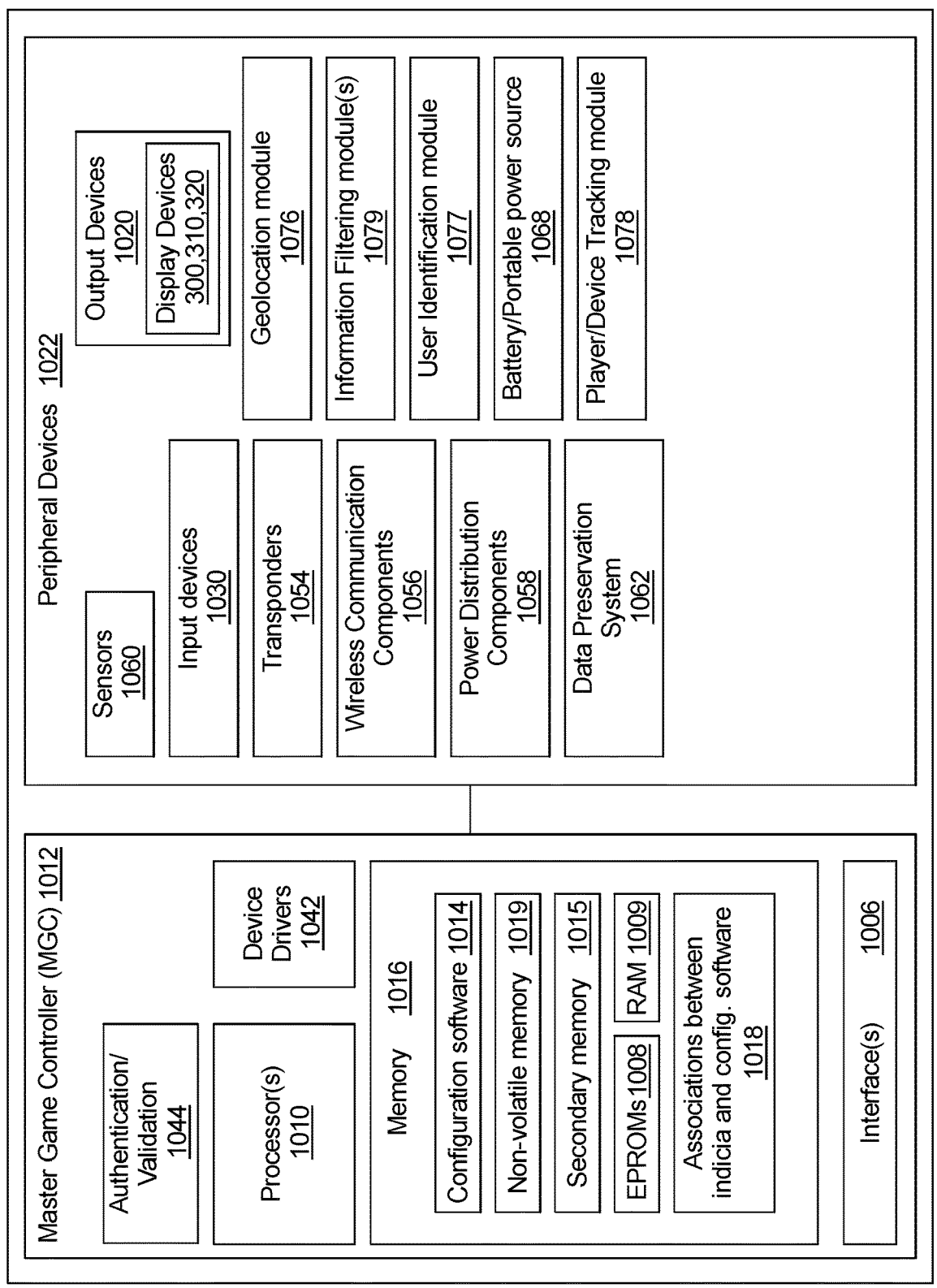
FIG. 7 is a schematic block diagram of one example embodiment of an electronic configuration of an electronic gaming machine of the present disclosure.

Referring now to FIG. 7, in various embodiments, an EGM 1000 of the present disclosure includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/

2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets."

In certain embodiments, in addition to the input, output and other components described in the first section above, the peripheral devices 1022 include several device interfaces, such as: (1) at least one output device 1020 including at least one display device 300, 310, and/or 320; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one portable power source 1068; (10) at least one user identification module 1077; (11) at least one player/device tracking module 1078; and (13) at least one information filtering module 1079.

The at least one output device 1020 includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM may include a ticket printer and dispenser. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method."

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM, such as an attract mode. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance.

In various embodiments, the at least one input device includes a plurality of buttons that are programmable by the EGM operator to, when actuated, cause the EGM to perform particular functions. For instance, such buttons may be hard keys, programmable soft keys, or icons displayed on a display device of the EGM (described below) that are actuatable via a touch screen of the EGM (described below) or via use of a suitable input device of the EGM (such as a mouse or a joystick).

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, in addition to the components described in the first section above, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM (in addition to the detections described above); detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The EGM of the present disclosure can also include at least one motion/gesture analysis and interpretation component (not shown) configured to analyze and/or interpret information relating to detected player movements and/or gestures to determine appropriate player input information relating to the detected player movements and/or gestures. For example, in one embodiment, the at least one motion/gesture analysis and interpretation component is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM 1000 to operate in a mobile environment.

The EGM may include at least one geolocation module (not shown) configured to acquire geolocation information from one or more remote sources and use the acquired geolocation information to determine information relating to a relative and/or absolute position of the EGM. For example, in one implementation, the at least one geolocation module is configured to receive GPS signal information for use in determining the position or location of the EGM. In another implementation, the at least one geolocation module is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

In certain embodiments, the EGM is a device that has obtained approval from a regulatory gaming commission, and in other embodiments, the EGM is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the EGM generates game outcomes and/or awards randomly or based on one or more probability calculations, there is no certainty that the EGM will ever provide any specific game outcome and/or award.

In certain embodiments, the EGM maintains one or more predetermined pools or sets of predetermined game outcomes and/or awards. In certain such embodiments, upon generation or receipt of a game outcome and/or award request, the EGM independently selects one of the predetermined game outcomes and/or awards from the one or more pools or sets. The EGM flags or marks the selected game outcome and/or award as used. Once a game outcome or an award is flagged as used, it is prevented from further selection from its respective pool or set; that is, the EGM does not select that game outcome or award upon another game outcome and/or award request. The EGM provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the EGM determines a predetermined game outcome and/or award based on the results of a bingo, keno, or lottery game. In certain such embodiments, the EGM utilizes one or more bingo, keno, or lottery games to determine the predetermined game outcome and/or award provided for a primary game and/or a secondary game. The EGM is provided or associated with a bingo card. Each bingo card consists of a matrix or array of elements, wherein each element is designated with separate indicia. After a bingo card is provided, the EGM randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the EGM is configured to communicate with the remote processor, central server, central controller, or remote host for monitoring purposes only. In such embodiments, the EGM determines the game outcome(s) and/or award(s) to be provided in any of the manners described above, and the remote processor, central server, central controller, or remote host monitors the activities and events occurring on the EGM. In one such embodiment, the EGM includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the EGM includes one or more executable game programs executable by at least one processor of the EGM to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the EGM includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the EGM. In certain such embodiments, the EGM includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The EGM enables a wager to be placed on one or more of such paylines to activate such paylines. In other embodiments in which one or more paylines are formed between at least two adjacent symbol display areas, the EGM enables a wager to be placed on a plurality of symbol display areas, which activates those symbol display areas.

In various embodiments, the EGM provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the EGM employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the EGM includes a progressive award. Typically, a progressive award includes an initial amount and an additional amount funded through a portion of each wager placed to initiate a play of a primary game. When one or more triggering events occurs, the EGM provides at least a portion of the progressive award. After the EGM provides the progressive award, an amount of the progressive award is reset to the initial amount and a portion of each subsequent wager is allocated to the next progressive award. Examples of progressive gaming systems or EGMs are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the EGM provides credits or other awards for one or more plays of one or more secondary games. The secondary game typically enables an award to be obtained in addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the EGM randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the EGM determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system or EGM includes one or more player tracking systems. Such player tracking systems enable operators of the gaming system or EGM (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the EGM to begin a gaming session, the card reader reads the player identification number off the player tracking card to identify the player. The EGM timely tracks any suitable information or data relating to the identified player's gaming session. The EGM also timely tracks when the player tracking card is removed to conclude play for that gaming session. In another embodiment, rather than requiring insertion of a player tracking card into the card reader, the EGM utilizes one or more portable devices, such as a mobile phone, a radio frequency identification tag, or any other suitable wireless device, to track when a gaming session begins and ends. In another embodiment, the EGM utilizes any suitable biometric technology or ticket technology to track when a gaming session begins and ends.

In such embodiments, during one or more gaming sessions, the EGM tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the first display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Certain of the gaming systems described herein, including EGMs located in a casino or another gaming establishment, include certain components and/or are configured to operate in certain manners that differentiate these EGMs and systems from general purpose computing devices (i.e., certain personal gaming devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are typically not state-based machines, and a majority of data can be lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

It should further be appreciated that the EGM of the present disclosure may have varying or alternative housing configurations.

It should further be appreciated that the EGM of the present disclosure may have varying or alternative display device configurations.

In various embodiments, the EGM of the present disclosure is configured to be positioned on a base or stand.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electronic gaming machine comprising:
a player distraction detector;
a display device;
an audio output device;
a processor; and
a memory device storing a plurality of instructions that, when executed by the processor, cause the processor to:
cause a display, by the display device, of a plurality of plays of a game;
during the plurality of plays of the game, operate with the player distraction detector to determine player distraction level data for a player of the electronic gaming machine; and
responsive to the player distraction level data indicating that the player is distracted from one of the plurality of plays of the game, change an output of both the display device and the audio device in association with one of the plurality of plays of the game, wherein the change of the output of the display device comprises a delay of a display, by the display device, of an action in one of the plurality of plays of the game, and wherein the change in the audio device comprises outputting an audio alert based on the player distraction level data.

2. The electronic gaming machine of claim 1, wherein the instructions, when executed by the processor, cause the processor to operate with the player distraction detector to determine the player distraction level data for the player of the electronic gaming machine on one of a continuous basis during the plurality of plays of the game and at regular intervals during the plurality of plays of the game.

3. The electronic gaming machine of claim 1, wherein the instructions, when executed by the processor, cause the processor to operate with the player distraction detector to determine the player distraction level data based on a determination that the player is using a mobile device separate from the electronic gaming machine.

4. The electronic gaming machine of claim 1, wherein the change of the output of the display device comprises a pause of a display, by the display device, of one of the plurality of plays of the game.

5. The electronic gaming machine of claim 1, wherein the change of the output of the display device comprises a change in the display, by the display device, of an action in one of the plurality of plays of the game configured to increase attention by the player to one of the plurality of plays of the game.

6. The electronic gaming machine of claim 1, wherein the change of the output of the display device comprises a display, by the display device, of a notice to the player.

7. The electronic gaming machine of claim 1, wherein the change of the output of the display device comprises a display, by the display device, of a question directed to the player.

8. The electronic gaming machine of claim 1, wherein the change of the output of the display device comprises a change in volume, outputted by the audio device, associated with one of the plurality of plays of the game.

9. The electronic gaming machine of claim 1, wherein the plurality of instructions, when executed by the processor, cause the processor to operate with the distraction detector to determine baseline player data comprising data related to an image of the player when the player is not distracted from one of the plurality of plays of the game.

10. The electronic gaming machine of claim 9, wherein the plurality of instructions, when executed by the processor, cause the processor to operate with the distraction detector to determine a plurality of different degrees of changes to the baseline player data.

11. An electronic gaming machine comprising:
a display device;
an audio output device;
a processor; and
a memory device storing a plurality of instructions that, when executed by the processor, cause the processor to:

cause a display, by the display device, of a plurality of plays of a game;

during the plurality of plays of the game, receive, from a player distractor detector, player distraction level data for a player of the electronic gaming machine; and responsive to the player distraction level data indicating that the player is distracted from one of the plurality of plays of the game, change an output of both the display device and the audio device in association with one of the plurality of plays of the game, wherein the change of the output of the display device comprises a delay of a display, by the display device, of an action in one of the plurality of plays of the game, and wherein the change in the audio device comprises outputting an audio alert based on the player distraction level data.

12. The electronic gaming machine of claim 11, wherein the player distraction level data for the player of the electronic gaming machine is based on a determination of whether the player is using a mobile device separate from the electronic gaming machine.

13. The electronic gaming machine of claim 11, wherein the change of the output of the display device comprises one of: a pause of a display, by the display device, of one of the plurality of plays of the game; a display, by the display device, of notice to the player; and a display, by the display device, of a question directed to the player.

14. A method of operating an electronic gaming machine, the method comprising:

determining, by a processor, player distraction level data relating to game play by a player of the electronic gaming machine; and responsive to the player distraction level data indicating that the player is distracted from the game play, causing an output of both a display device of the electronic gaming machine and an audio device of the electronic gaming machine in association with the game play to account for the player being distracted from the game play, wherein the output of the display device comprises a delay of a display, by the display device, of an action in the game play, and wherein the output of the audio device comprises an audio alert based on the player distraction level data.

15. The method of claim 14, wherein causing the output of one of the display device of the electronic gaming machine comprises one of: pausing of a display, by the display device, of the game play; displaying, by the display device, a notice to the player associated with the game play; and displaying, by the display device, a question directed to the player associated with the game play.

16. The method of claim 14, wherein the output of the audio display comprises a change in volume outputted by the audio device associated with the game play.

17. The method of claim 14, which comprises determining, by the processor, the player distraction level data based on a determination that the player is using a mobile device separate from the electronic gaming machine.

18. The method of claim 14, which comprises determining, by the processor, the player distraction level data based on a comparison of a plurality of images of the player taken by a camera.

19. The method of claim 18, wherein one of the plurality of images is a baseline image of the player not distracted from the game play.

* * * * *